(12) United States Patent
Hansen et al.

(10) Patent No.: US 7,552,211 B2
(45) Date of Patent: *Jun. 23, 2009

(54) AUTOMATIC NOTIFICATION RULE DEFINITION FOR A NETWORK MANAGEMENT SYSTEM

(75) Inventors: Peter A. Hansen, Cypress, TX (US); Justin E. York, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1192 days.

This patent is subject to a terminal disclaimer.

(21) Appl. No.: 10/315,749

(22) Filed: Dec. 10, 2002

(65) Prior Publication Data

US 2003/0084150 A1    May 1, 2003

Related U.S. Application Data

(63) Continuation of application No. 09/231,251, filed on Jan. 15, 1999, now Pat. No. 6,493,755.

(51) Int. Cl.
    *G06F 15/173* (2006.01)
(52) U.S. Cl. .............. 709/224; 709/223; 709/226; 709/232; 709/203
(58) Field of Classification Search .......... 709/223, 709/224, 203, 226, 232
    See application file for complete search history.

(56) References Cited

U.S. PATENT DOCUMENTS

| | | | | |
|---|---|---|---|---|
| 5,063,523 A | * | 11/1991 | Vrenjak | 709/223 |
| 5,615,359 A | * | 3/1997 | Yung | 707/10 |
| 5,802,255 A | * | 9/1998 | Hughes et al. | 706/59 |
| 5,809,238 A | * | 9/1998 | Greenblatt et al. | 709/202 |
| 6,009,475 A | * | 12/1999 | Shrader | 709/249 |
| 6,167,448 A | * | 12/2000 | Hemphill et al. | 709/224 |
| 6,212,581 B1 | * | 4/2001 | Graf | 710/18 |
| 6,493,755 B1 | * | 12/2002 | Hansen et al. | 709/224 |
| 6,510,457 B1 | * | 1/2003 | Ayukawa et al. | 709/217 |
| 6,553,403 B1 | * | 4/2003 | Jarriel et al. | 709/202 |
| 6,631,409 B1 | * | 10/2003 | Watson et al. | 709/224 |
| 6,920,468 B1 | * | 7/2005 | Cousins et al. | 707/203 |
| 7,103,420 B2 | * | 9/2006 | Brown et al. | 700/19 |
| 2004/0111471 A1 | * | 6/2004 | Stoner et al. | 709/204 |

OTHER PUBLICATIONS

SPECTRUMsoftware Solutions and Services Introduces The SPECTRUM Starter Bundle Promotion, http://www.cabletron.com/spectrum/bundle-promo.html, Cabletron Systems, pp. 1-6 (Dec. 1, 1998).

(Continued)

*Primary Examiner*—Ario Etienne
*Assistant Examiner*—Barbara N Burgess

(57) ABSTRACT

A network management application provides notification of events on network devices using prepopulated notification rules. The notification rule is prepopulated by the network management application using conditions that represent the present state of the device being monitored. An associated notification action is executed when an event on a network device satisfies the conditions of the prepopulated notification rule. The notification action can be tested without actually creating a set of conditions for a device that satisfies the conditions of the notification rule.

19 Claims, 8 Drawing Sheets

OTHER PUBLICATIONS

Cabletron's Network Management Platform Certified for the Defense Department's Common Operating Environment Initiative, http://www.cabletron.com/ournews/1999/jan/1-13.html, Cabletron Systems, pp. 1-2 (Jan. 13, 1999).

Bournellis, Cynthia, NetManagement Eased, Computer World, Inc., http://www.computerworld.com/home/print.nsf/all/98102691A6, pp. 1-2 (Oct. 26, 1998).

* cited by examiner

AUTOMATIC NOTIFICATION RULE DEFINITION FOR A NETWORK MANAGEMENT SYSTEM

CROSS-REFERENCE TO RELATED APPLICATIONS

This application is a continuation of U.S. patent application Ser. No. 09/231,251, filed Jan. 15, 1999 now U.S. Pat. No. 6,493,755, which is incorporated herein in its entirety by reference.

BACKGROUND OF THE INVENTION

Description of the Related Art

Network management has experienced explosive growth and become a fundamental part of network infrastructure. Network management is essentially a set of tools and processes that enables one to control, monitor, and troubleshoot a network. A network manager typically uses standalone or integrated network management software to collect and process management data from the network.

One of the functions served by network management software is the monitoring (or health polling) and notification of the state of various network devices. The state of a monitored device is reported, for example, as an entry in an event log dialog. As the use of network systems has grown, so too has the size of the networks. As such, many network systems are very complex. Likewise, network management for these large systems can be very complex. To provide a manageable interface, the network management software may be configured to report only changes in the state of a device. To further streamline reporting performed by network management software, a notification rule may be created to report only certain instances or severities of particular network changes.

A notification rule is a description of a type of event, or set of conditions, that triggers a notification. The notification rule tells the network management software when to notify a user or an administrator of an event. Generally, a notification rule is defined by a set of conditions relating to the device being monitored. These conditions may describe the present state of a device. Some event information that has been used to define notification rules are device types, alarm event types and alarm severity classes.

For example, a notification rule can be based in whole or in part on an alarm threshold condition to indicate when a network device, monitored by the network management software, exceeds or exits a certain operating state for that device. A rule for a network router device can be triggered using an alarm threshold set for monitoring the number of dropped or lost data packets. The alarm and subsequently the notification rule, is triggered when the number of dropped data packets exceeds the preset threshold. In addition, a corresponding alarm severity class can be set to limit triggering of the notification rule based on the extent to which the threshold had been exceeded. Alarm severity classes, for example, have included cleared (or informational), indeterminate, minor, major and critical alarm classes. For example, a number of dropped data packets only slightly exceeding the alarm event threshold is represented by a "minor" alarm, while a number of dropped data packets greatly exceeding the threshold is represented by a "critical" alarm. In addition, an "informational" alarm severity class has been established to provide information for devices not exceeding normal operating conditions.

Typically these notification rules have been created by a user or a network administrator. Much like the network systems they were designed to monitor, the notification rules have become increasing complex. Specifically, the user must step through a number of procedures to properly configure a notification rule for a particular device or a particular state of a device. Specifically, each of the event conditions included in a notification rule required that a user first retrieve the information describing the condition from somewhere within the network management software application. Next the user was required to manually enter in the relevant information into the notification rule. Finally, to complete the notification process, the user was required to specify a particular notification action that would be performed when the conditions defining the notification rule had been satisfied.

To further complicate the process, a number of alarm event and alarm severity combinations can be used. Typically, the combination of conditions for a particular notification rule was selected by taking the present state of a device. Specifically, the network management software would indicate the occurrence of an event for a device on the network and display such on a monitor at its location on the network server. An administrator then would typically desire that he be notified in the future upon subsequent like changes in the state of that particular device. Therefore, the notification rule would be created based on the set of conditions defining the state of the device in question.

The notification rule would include a notification action specified by the administrator. These notifications actions included, for example, executing a script at the server location, reporting the particular event occurrence on a separate event log saved in the network management software, indicating a change in the state of the device by creating a sound on the host computer, sending an e-mail to a remote e-mail address, and sending a page to a remote receiver, for example the administrator's pager. Any of these notification actions, or any combination thereof, would be performed by the network management software when the state of the monitored device matched the particular state upon which the notification rule conditions were based.

Configuring notification rules was time consuming, requiring a user or an administrator to manually configure all the information needed to define the notification rule. In addition, the administrator was usually left with no real way to test the specified notification action. In this way, upon creation of a notification rule, an administrator was unable to test the action without actually causing the event conditions that triggered the notification action to occur. A network administrator was forced to either skip testing the notification to see if its effect is what is intended, or forced to attempt to create the event artificially to test the notification. Under many critical situations, creating an actual network problem may be undesirable from a systems standpoint, if not altogether impossible.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

A device management application has been developed that provides automatic monitoring of devices that are connected to a communication network and are manageable using simple network management protocol. Such an SNMP network management application is described in commonly assigned U.S. patent application Ser. No. 09/098,027 entitled "Method and Apparatus for Automatic Monitoring of Simple Network Management Protocol Manageable Devices" to Jeffrey A. Schunicht, Justin E. York, Pete A. Hansen and Charles W. Cochran, filed Jun. 15, 1998, hereby incorporated by reference as if set forth in its entirety.

A remote application has been developed that provides a web-based interface for network management software. Such a remote network management application is described in concurrently filed, commonly assigned U.S. patent application Ser. No. 09/231,286, entitled "Interactive Web-Based Network Management" to Jeffrey A. Schunicht, Justin E. York, Pete A. Hansen and Charles W. Cochran, filed Jan. 15, 1999, hereby incorporated by reference as if set forth in its entirety.

A remote interface has been developed that provides automatic matching of color indicators displayed on a local network management application. Such a color matching application is described in concurrently filed, commonly assigned U.S. patent application Ser. No. 09/232,409, entitled "Automatic Synchronization of State Colors Across a Web-Based System" to Justin E. York, filed Jan. 15, 1999, hereby incorporated by reference as if set forth in its entirety.

Figure 1:
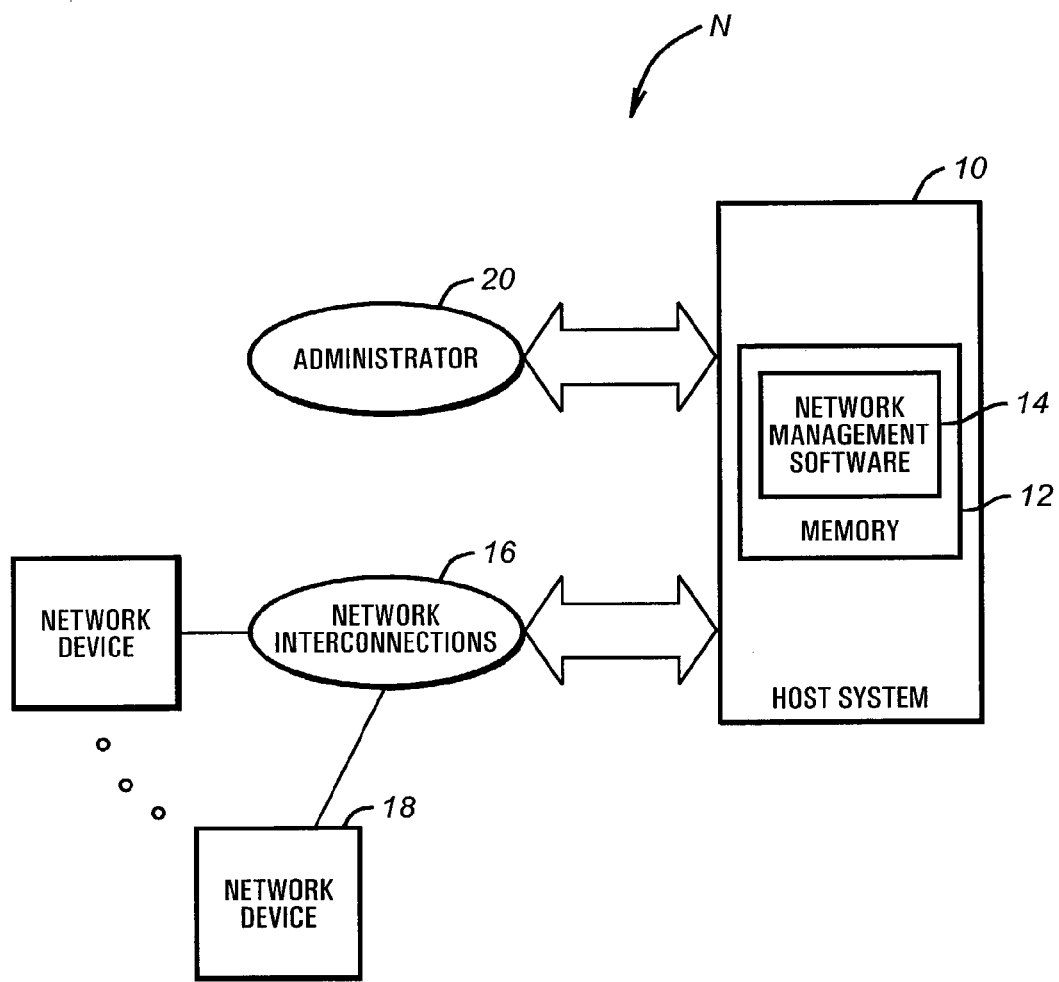
FIG. 1 is a block diagram of a network management system.

FIG. 1 illustrates a network management system according to the invention. The system N allows an administrator 20 to receive notifications that report the present state of a particular network device 18. The network devices 18 are monitored via network interconnections 16 by a network management software 14 residing in the memory 12 of a host computer system 10. The network management software 14 most generally monitors the status of the various network devices 18 connected to the network. In addition, however, network management software 14 is capable of receiving requests from the network and responding thereto. The network management software 14 is further capable of receiving and responding to requests from a network administrator 20. Specifically, an administrator 20 is able to configure the notification function provided by the management software to limit notification, or device status reporting, to only those instances in which a network event occurs. Most generally, a network event represents a change in status of a device being monitored. Therefore, the administrator 20 is able to request the network management software 14 to execute a notification action only when a preselected event occurs. To achieve this notification for specific network occurrences, the network administrator 20 configures the network management software 14 by defining a set of event conditions that describe the particular state upon which notification will occur. Therefore, the network management software 14 allows the user or network administrator 20 to receive notification of certain preselected events that occur on the network. Specifically, these events are tied to network devices. The trigger that causes a notification to take place is generally called a "notification rule."

The action performed when a notification rule is triggered is called a "notification action." Examples of notification actions may be paging a users pager, sending email, playing sounds or beeps on a speaker, or logging event messages to a network log, on the network management software. The particular notification action, or combination of notification actions, is typically specified by the administrator.

Figure 2:
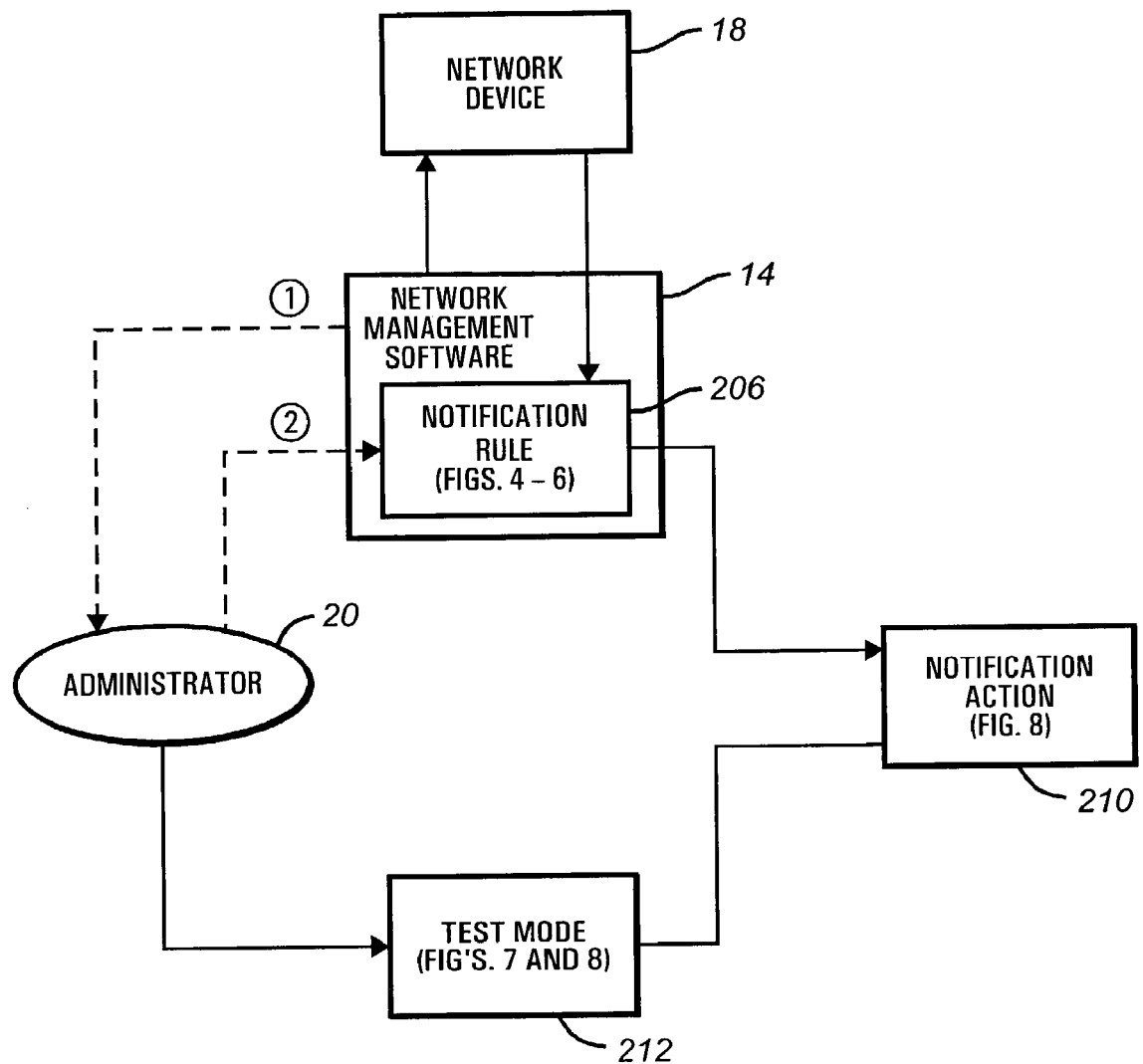
FIG. 2 is a more detailed block diagram of the network management system of FIG. 1.

Turning now to FIG. 2, shown is a more detailed block diagram of a network management application as shown in FIG. 1. Specifically, FIG. 2 illustrates both the creation of a notification rule and the testing of a notification action. The notification rule 206 is part of the network management software 14 and defines when the network management software 14 will execute a notification action associated with a particular event occurring on the network. Triggering the notification rule 206 triggers the user specified notification action 210.

Typically, a notification rule 206 is defined by a set of event conditions on a particular device. Typically, these event conditions include the device identification of the device on which the notification rule 206 is to be based, the type of event that triggers the rule and the severity of those events necessary to trigger the rule. A previous event in an event log in the network management software 14, through its monitoring of a network device 18, already contains all of this information. The network management software 14 is thus able to automatically prepopulate the various conditions, or fields, of the notification rule 206 when that notification rule is derived from an existing event or device condition. In this way, creation of a notification rule 206 does not require the administrator 20 to first "look up" or consult the network management software (path (1)) and then to transpose this information into the notification rule 206 (path (2)). Instead, upon an administrator 20 request to create a notification rule for a particular device, the network management software 14 through its normal monitoring of present device states for all network devices, automatically prepopulates the fields of the new notification rule 206 with the present state of the preselected network device or with a device state of an entry stored in an event log. Prepopulating the notification rule 206 is discussed in more detail below with reference to FIG. 4-6.

A reference to a notification action to be performed upon triggering of the notification rule 206 is also included in creation of a notification rule. Specifically, when the set of event conditions describing the present state of the device satisfies the set of predetermined conditions defined by the notification rule, the notification rule causes the preselected notification action to be taken. In addition, the notification action 210 may be tested via the test mode 212. The test mode 212 causes the notification action 210 to be performed by automatically simulating satisfaction of the set of predetermined conditions defined by the notification rule. The test mode 212 is discussed in more detail below with respect to FIGS. 7 and 8.

Figure 3:
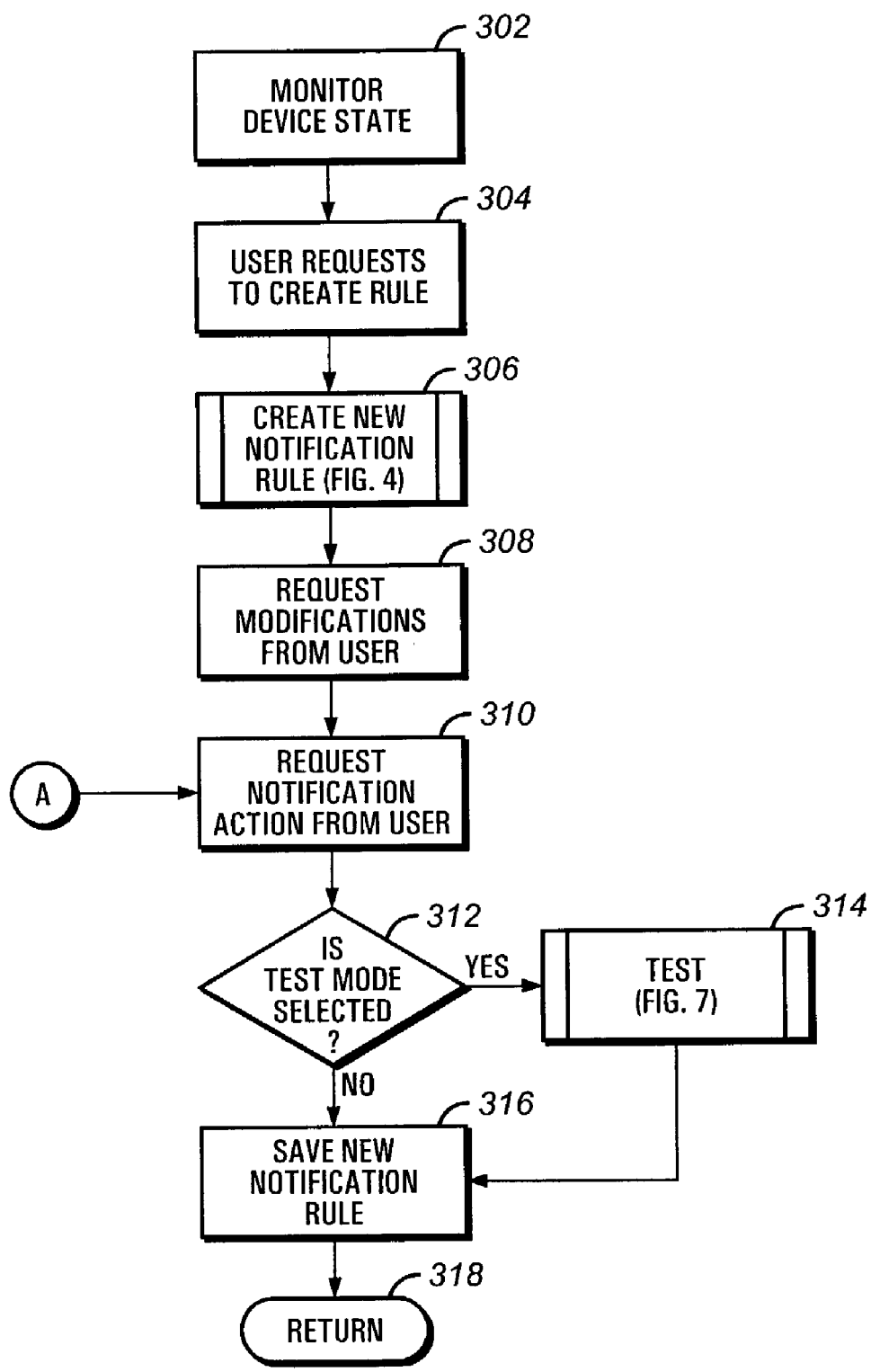
FIG. 3 is a flow diagram of an automatic notification process in accordance with the present invention.

Turning now to FIG. 3 shown is a flow diagram for automatically prepopulating a new notification rule and testing a specified notification action. As part of normal operation network management software 14, monitors the present state for each of the network devices 18 connected to the network N a stop 302. The Create New Notification Rule function 306 is then initiated after the administrator 20 requests that the network management software 14 create a new notification rule for the selected device 304. A common circumstance under which a user may request creation of a new notification rule is where the network management software, through its device monitoring, displays or otherwise indicates on the host computer system 10 that a change in the state of a network device has occurred. Such a occurrence, for example, may be indicated by a change in the color of a icon representing the state of the particular network device. Typically, the administrator will then wish to track or otherwise be notified of subsequent like changes in the device state. In this instance, the notification rule 206 is based on the event conditions that describe the state presently monitored by the network management software 14.

An administrator may also wish to be notified of subsequent occurrences of a particular alarm or error for a particular device. Specifically, after the network manager detects an alarm or an error for a network device, the administrator can create a new notification rule that is based on the conditions that define the particular alarm detected by the network management monitoring function. Subsequent occurrences of that same alarm for the selected device will then trigger the notification rule causing the specified notification action to be performed.

In a like manner, a new notification rule may be based on the conditions that define a particular alarm or an event stored in an event log. In such an instance, the conditions for the new notification rule are taken from the conditions of a preexisting event or alarm contained in a entry in the event log.

Once a new notification rule is requested, the new notification rule is then prepopulated with a set of conditions representing the specified state of a monitored network device, such as the present state, a specified alarm state or a prior state stored on an event log. The prepopulation feature will be discussed in more detail below with reference of FIG. 4. At step 308 the administrator can make modifications to the rule. For example, the administrator can modify one of those fields prepopulated by the Create New Notification Rule function 306. The function continues at step 310 by requesting a particular notification action from the user to be performed upon triggering of the notification rule. Specifically, the notification action will be performed when the set of event conditions representing the present state of the monitored device satisfies the predetermined conditions defined by the notification rule for that device.

At step 310, the notification action may be created as a new action or may be selected from a list of preexisting notification actions. For example, according to one embodiment of the present invention, an action table can store in memory a number of user created notification actions. Within the notification rule, an administrator or user is able to select one of these predefined actions. The notification rule is then assigned a pointer to that action in the action table.

At step 312, it is determined whether the user or administrator has selected the test mode 212 to test the notification action. According to one embodiment, the notification action may be tested either when the notification action is first created or later edited. Alternatively, the notification action may be tested at any time after the action has been created. The test function 314 will be discussed in more detail below with reference to FIG. 7.

The notification rule is then saved at step 316 after the test mode 212, if selected, has tested the notification action. If the test mode 212 has not been selected, the notification rule is saved without calling the test function 314. The function returns to the calling function at step 318.

Figure 4:
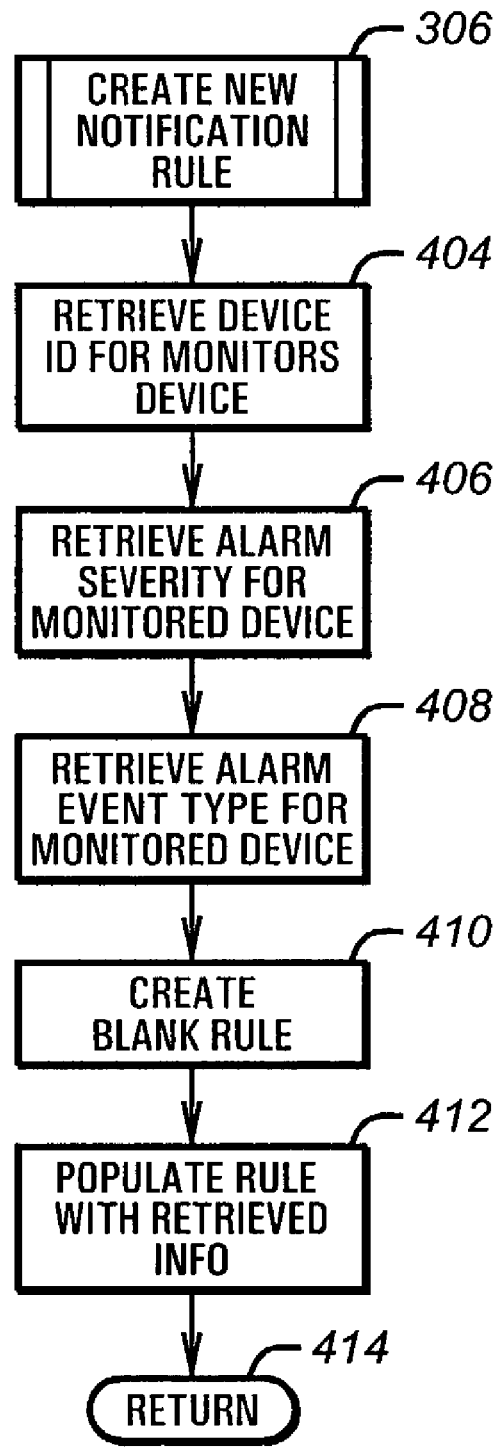
FIG. 4 is a flow diagram of prepopulating a new notification rule in accordance with the notification process of FIG. 4.

Turning now to FIG. 4, shown is a flow diagram for the Create New Notification Rule function 306 according to one embodiment of the present invention. The Create New Notification Rule 306 begins by retrieving from the network management software 14 the device ID for the monitored device 404, the alarm severity 406, and the alarm event type for the monitored device 408. As mentioned above, when the notification rule 306 is based on the present state of a selected device, this information is already known by the network management software 14 via its normal operation of monitoring the present states of network devices. Further, this retrieval is performed internally and automatically without user assistance. Specifically, once an administrator 20 requests that a new notification rule be created for a particular device, the set of event conditions known by the network management software 14 pertaining to the present state of the selected device is retrieved by the Create New Notification Rule function 306. It should be understood that while alarm severity conditions and an alarm event type conditions are used for exemplary purposes to create the new notification rule, other conditions that relate to the state of the device on the network may be retrieved and subsequently prepopulated. Furthermore, although a device ID is used for exemplary purposes, the notification rule may be defined to key off of a group or class of devices. For example, a device map can be used to define a class of devices that are associated in some way. In addition, a device type can be used to define a class of devices that share a common characteristics, for example all routers.

The Create New Notification Rule 306 continues at step 410 by creating a new blank rule. The conditions retrieved from the network management software 14 are then populated into the new blank rule at step 412. At this point, the conditions known by the network management software are also contained in the new notification rule for the selected device. At step 414 the create new notification rule 306 returns to its calling function.

Figure 5:
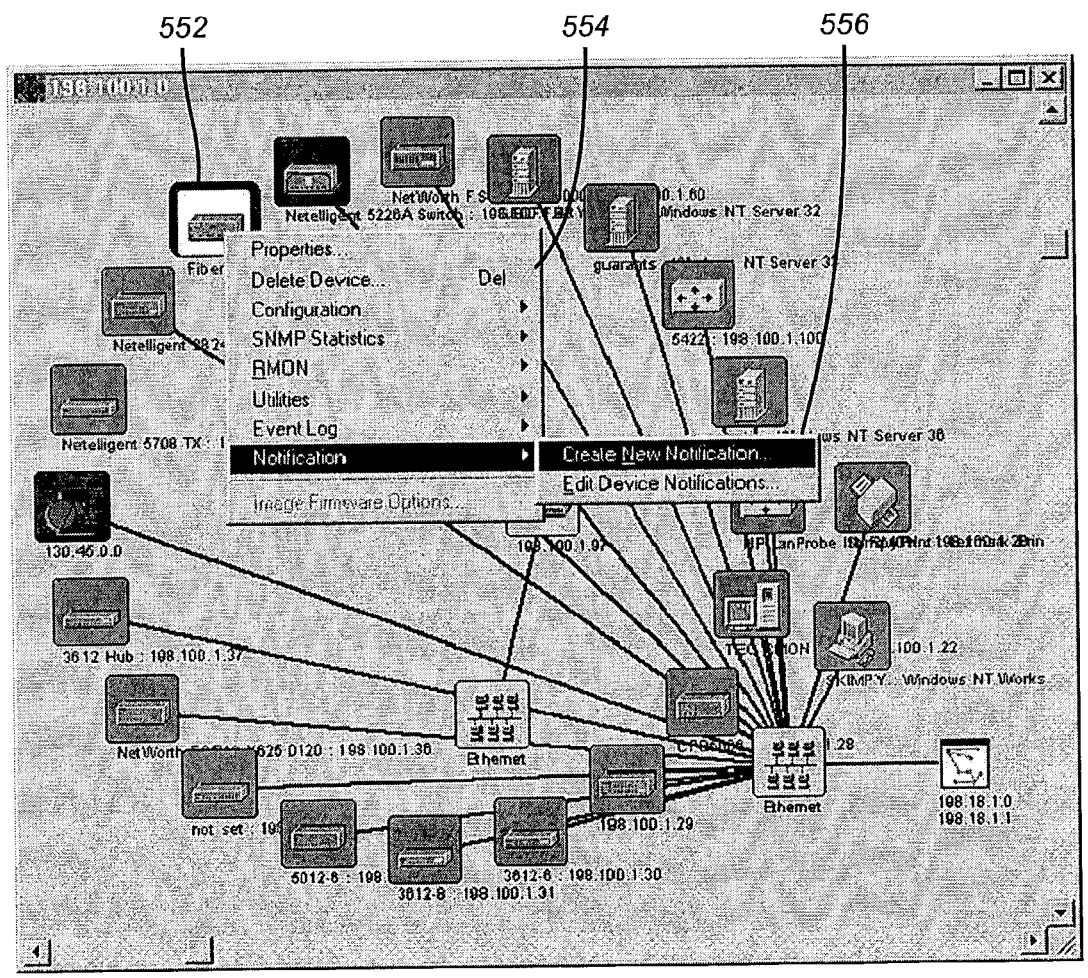
FIG. 5 is a screen shot showing a network management system displaying the state of network devices.

Turning now to FIG. 5, shown is an exemplary implementation for automatically creating a new notification rule according to one embodiment of the present invention. Specifically, the administrator 20 selects a network device 552, monitored by the network management software 14, by clicking the right button on a mouse device connected to the host system 10. In so doing, a notification feature may be selected from a menu of options 554. The notification option further contains the options of either creating a new notification rule or editing an existing a device notification rule 556.

Figure 6:
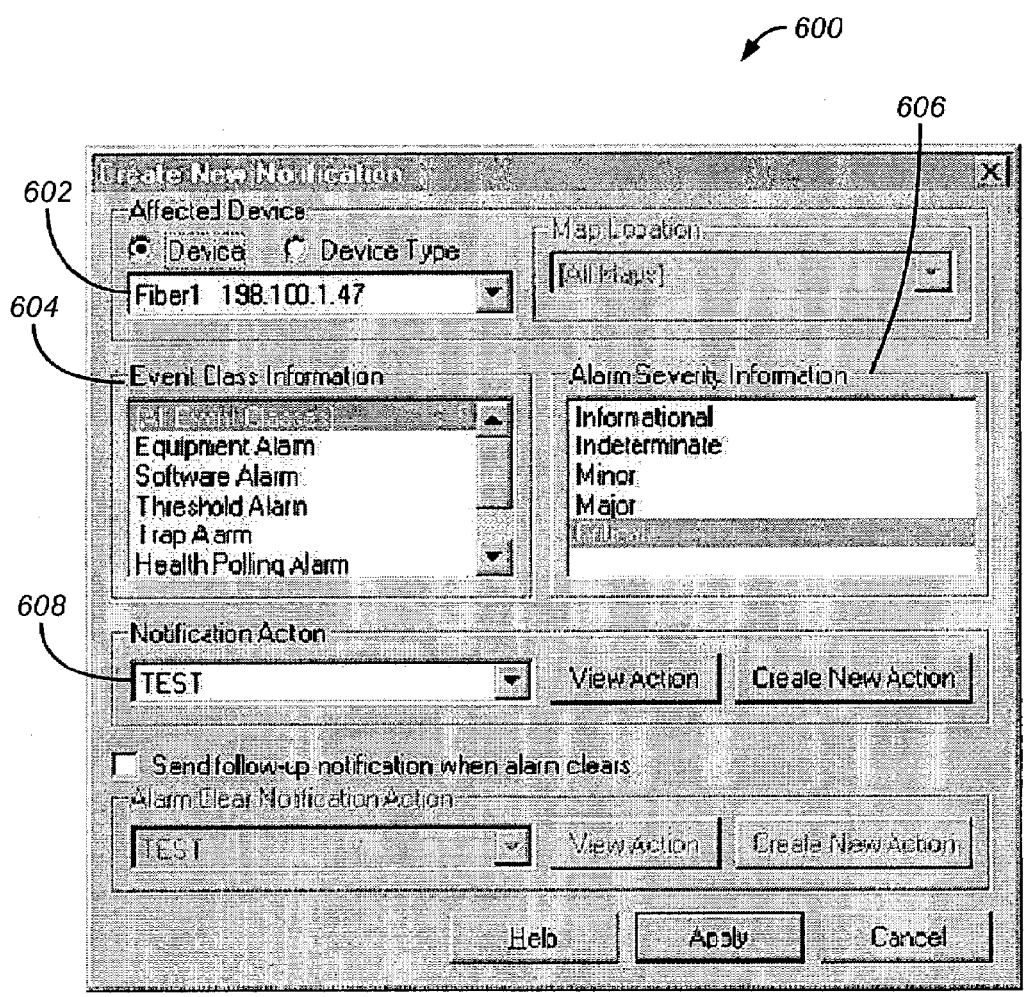
FIG. 6 is a screen display illustrating prepopulation of a notification rule in accordance with the prepopulation process of FIG. 5.

Once the administrator 20 has requested the network management software 14 to create a new notification rule for a particular device, the create new notification dialog window appears with the prepopulated information preselected. FIG. 6 shows an exemplary create new notification dialog 600 for one embodiment of the present invention. Upon an administrator request to create a new notification rule for a selected device 552, the event information for the selected device 552, including the device identification 602, the event class information 604, and the alarm severity information 606 is automatically prepopulated into the dialog 600.

In this case, the administrator 30 has selected the device identified by "Fiber 1:198.100.1.47" 552. According to one embodiment of the present invention, this is done by right clicking a mouse device on the icon corresponding to that device in the main network management display from FIG. 5. The event class information 604 and the alarm severity information 606 prepopulated or loaded into the notification rule dialog 600 describes the state of the device monitored by the network management software 14 at the time the user selected the device. In this way, the administrator is saved the trouble of manually filling in redundant information that the network management software already knows. All the information that is already known by the network management software is automatically prepopulated into the notification rule dialog at the time the user requests that a new notification rule be created. Specifically, when a notification rule is based on a set of conditions describing the present state of a device, the administrator is not required to first track down the event conditions defining the present state of the device and second to then transpose this information into the create new notification dialog 600. All that remains for the administrator is to specify the particular notification action 608 to be performed when the conditions of the notification rule are satisfied.

Figure 7:
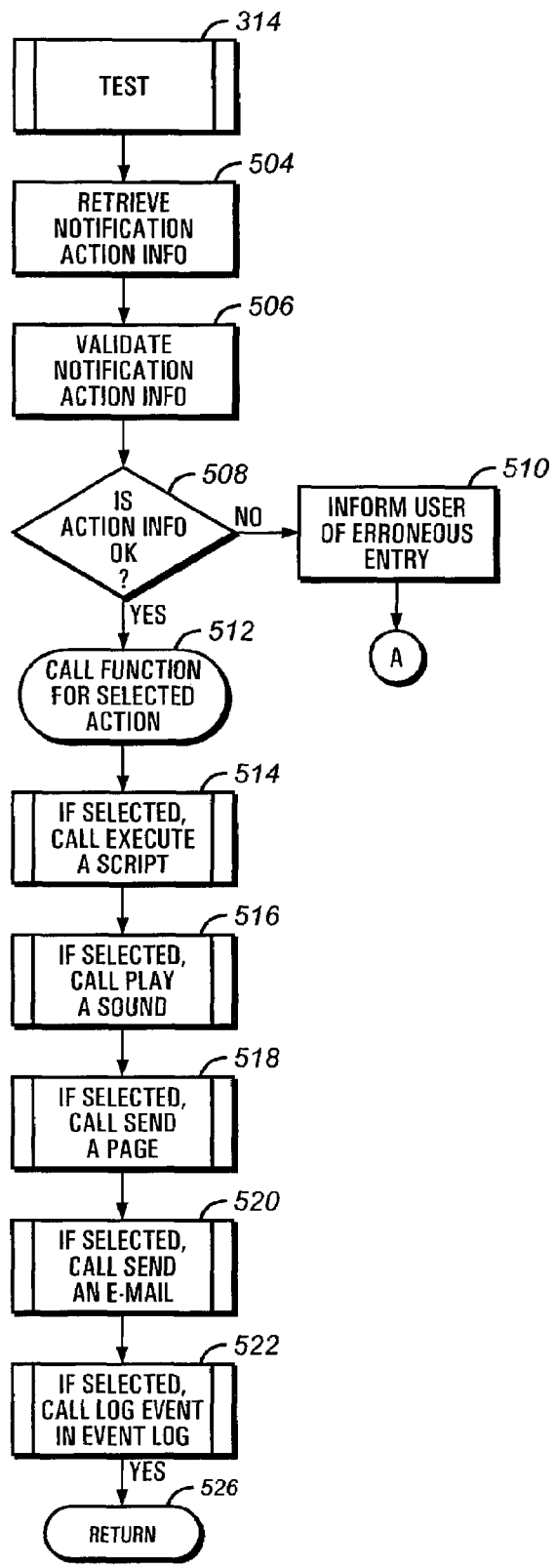
FIG. 7 is a flow diagram of a process for testing a notification action of a notification rule.

Turning now to FIG. 7, shown is a flow diagram of the test function 314. The test function begins by first retrieving at step 504 and validating at step 506 the notification action information entered by the administrator or user. In the event the test function 314 detects erroneous notification action information at step 508, the function informs the user of the erroneous entry at step 510 and then returns to the main function at step 310. Although for exemplary purposes, the validation process is part of the test mode function, the validation process may be performed independent of selection of the test mode. Specifically, according to one embodiment of the present invention, this validation process is performed for every notification action upon its creation or modification.

In the event the notification action information is okay at step 508, the test function calls the corresponding function to perform the selected action 512. Although a number of actions may be selected, for exemplary purposes a notification action may cause a predefined script to be executed 514, may result in an audible sound 516, the network management software may send a page to a pager 518, or may log the particular event in an event log 552 and may send an e-mail to an email address 520. It will be understood that these actions are common actions for notifying a user of any number of different occurrences in a computer system and implementation thereof will be understood by one skilled in the art. In addition, the notification action may result in an combination of a number of notification actions. When all actions have been performed, the test mode function 314 returns to the calling function at step 526.

Figure 8A:
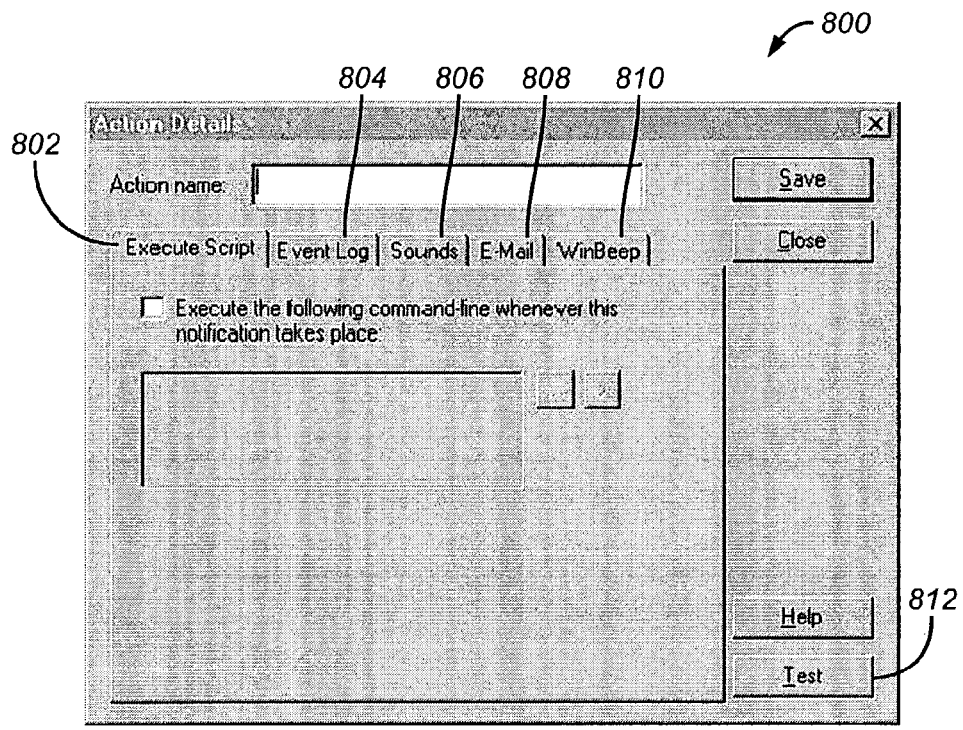
FIGS. 8A and 8B are screen displays illustrating testing of a notification action in accordance with FIG. 7.
Figure 8B:
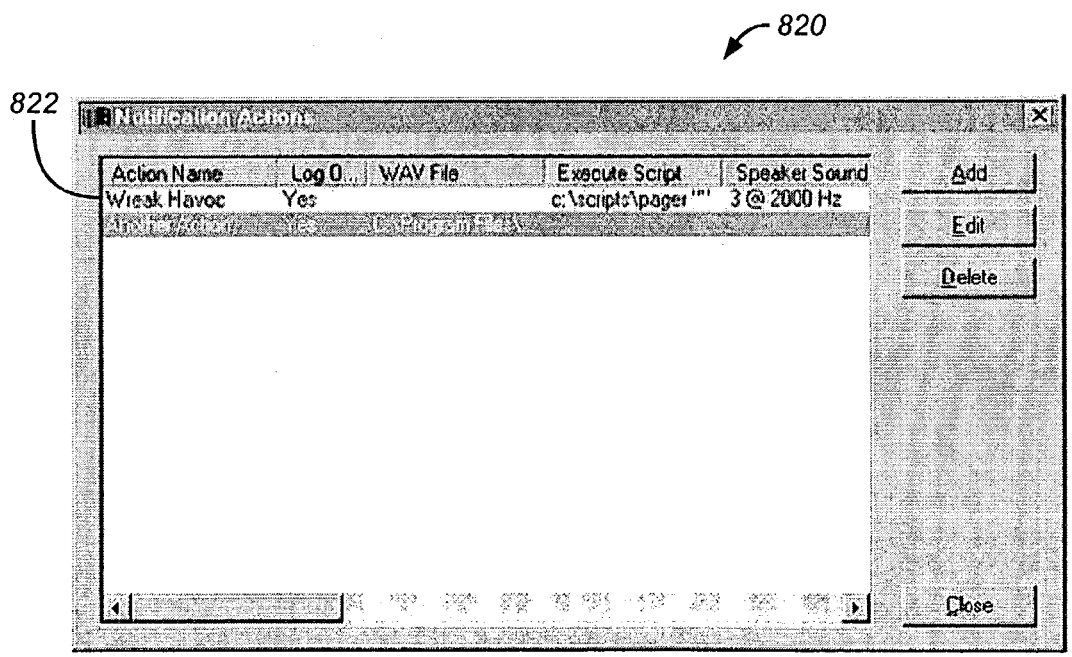

Turning now to FIGS. 8A and 8B, shown are exemplary implementations of the test mode function 314. FIG. 8A illustrates an exemplary screen shot of the notification action dialog 800 according to one embodiment of the present invention. The notification action dialog 800 illustrates the various options of notification actions available. Examples of the notification actions performed by the network management software 14 may be the execution of a predefined script 802, logging the event in an event log 804, creating an audible noise 806, sending an e-mail to an email address 808, or paging a pager 810. Further included in the notification action dialog 800 is a test button 812 for initiating the test mode feature. By clicking on the test button using a mouse device, an administrator or user is able to test the selected notification action or actions by simulating satisfaction of the notification rule. Therefore, notification is performed without requiring the user to actually recreate or emulate the set of event conditions that trigger the notification rule. In this way, according to one embodiment of the present invention, testing of the notification action is performed without actually triggering the notification rule.

Although, for exemplary purposes, simulating satisfaction of the notification rule is accomplished by the test mode directly calling those functions that direct the host computer to perform the specified action, the notification action may be tested using other methods of simulating satisfaction of the conditions of the notification rule. Specifically, testing may be accomplished by supplying the notification rule with artificial input conditions that satisfy the predetermined conditions defined in the notification rule. In this way, the notification action is tested directly by the notification rule but without creating an actual network event to satisfy the conditions of the notification rule. Satisfaction of the condition of the notification rule is simulated.

Using the notification item 822 from the notification action log dialog window 820 shown in FIG. 8B, an exemplary test mode application will be described. Specifically, the action named "wreak havoc" 822 lists a number of notification actions to be performed upon satisfaction of the set of event conditions defined by the appropriate notification rule. However, the test button 812 initiates the test mode feature to test the specified notification actions by simulating satisfaction of the conditions defined in the notification rule. According to one embodiment, the notification action is executed without triggering the conditions of the notification rule. According to another embodiment, the notification action is performed when the conditions of the notification rule have been triggered but without recreating the network event defined by the event conditions. Using the wreak havoc example, triggering of the notification rule causes the detected event to first be logged in an event log, typically controlled by the network management software, will cause a user defined script to be executed and will cause an audible noise of three beeps at 2,000 Hz frequency to be played. These notification actions will be performed in one of two ways. First, triggering of the notification rule to which the notification action wreak havoc is assigned will cause each of the notification actions specified to be performed. Triggering of the notification rule occurs when a network event takes place that matches the event defined by the notification rule. Second, the notification action specified may be tested using the test mode which merely simulates satisfaction of the notification rule. Therefore, testing of the notification action specified by the user does not require that the user create an event that satisfies the conditions defined in the notification rule.

Further, the creation of a notification rule does not require an administrator to manually configure all the information needed to define the notification rule. Such manual configuration is both time consuming, error prone and redundant since all the information is already available to the network management software. Specifically, the notification rule is prepopulated with the information that is already known by the network management software for a selected device. Therefore, a notification rule is automatically created when the administrator right clicks on a mouse device on a icon corresponding to the device at issue.

The foregoing disclosure and description of the preferred embodiment are illustrative and explanatory thereof, and various changes in the number of variables, number of parameters, order of steps, field sizes, data types, code elements, code size, connections, components, color object types, and circuitry, as well as in the details of the illustrated hardware and software and construction and method of operation may be made without departing from the spirit of the invention.

We claim:

1. A method for notifying a user that an event has occurred on a computer network system, the event representing a change in the status for a device connected to the computer network and defined by a set of event conditions, the notification occurring when the event conditions satisfy a set of predetermined conditions, the method comprising a host computer, having a host processor, executing the steps of:
- requesting creation of a notification rule;
- receiving a set of values based on a specified state of the device;
- prepopulating a notification rule based on the set of values; and
- selecting a notification action to be taken upon satisfying the notification rule.

2. The method of claim 1, wherein the requesting step is performed in response to a trigger event.

3. The method of claim 2, wherein the trigger event is an event representing a change of state of the device.

4. The method of claim 1, the step of prepopulating comprising the steps of:
- presenting a notification rule creation dialog; and
- automatically prepopulating event conditions in the notification creation dialog.

5. The method of claim 1, the step of selecting a notification action comprising the step of:
- presenting a list of predefined notification actions; and
- selecting one of the predefined notification actions.

6. The method of claim 5 the step of selecting a notification action comprising the step of:
- creating a new notification action.

7. The method of claim 1, wherein the prepopulated values can be modified manually.

8. The method of claim 1, further comprising the step of:
- notifying the user when the condition of the notification rule is satisfied according to the notification action specified.

9. The method of claim 8, wherein the step of notifying further comprises the step of:
- testing the notification action in a test mode by simulating satisfaction of the conditions of the notification rule.

10. The method of claim 9, wherein simulating satisfaction of the conditions of the notification rule occurs without triggering the conditions of the notification rule.

11. A computer network system for notifying a user that an event has occurred on the computer network system, said computer network system having one or more system resources, comprising:
- a computer network;
- a plurality of devices coupled to the computer network;
- a monitoring device for monitoring a specified state of the devices, the specified state of a selected device defined by a series of conditions for the selected device;
- a host computer, having a host processor, coupled to the computer network;
- a program storage device coupled to the host processor having a computer readable code embodied therein for notifying a user of a change in the status for a device coupled to the computer network, the code for directing the host computer to perform the steps of:
- requesting creation of a notification rule;
- receiving a set of values based on a specified state of the device;
- creating a notification rule having values for defining when notification will occur;
- prepopulating the notification rule with the received set of values; and
- selecting a notification action to be taken upon satisfying the notification rule.

12. The computer network system of claim 11, wherein the requesting step is responsive to an alarm for the device.

13. The computer network system of claim 11, wherein the specified state of the device is the present state of the device.

14. The computer network system of claim 11, wherein the specified state of the device is a prior state of the device.

15. The computer network system of claim 11, wherein the step of prepopulating is performed automatically.

16. The computer network system of claim 11, the step of prepopulating comprising the steps of:
- presenting a dialog of selectable notification conditions;
- prepopulating dialog fields with the received set of values; and allowing a user to rewrite the prepopulated fields.

17. The computer network system of claim 11, further comprising the step of:
- testing the notification action in a test mode by simulating satisfaction of the conditions of the notification rule.

18. The computer network system of claim 17, wherein simulating satisfaction of the conditions of the notification rule occurs without triggering the condition of the notification rule.

19. A computer system, comprising:
- a program storage device having computer readable code embodied therein for notifying a user of a change in the status for a device coupled to the computer system via a network, the code for directing the computer system to perform the steps of:
- requesting creation of a notification rule;
- receiving a set of values based on a specified state of the device;
- creating a notification rule having values for defining when notification will occur;
- prepopulating the notification rule with the received set of values; and
- selecting a notification action to be taken upon satisfying the notification rule.

* * * * *